(No Model.) 4 Sheets—Sheet 1.
H. KENNEDY.
GAS REGULATING AND CUT-OFF VALVE.
No. 457,203. Patented Aug. 4, 1891.

WITNESSES

INVENTOR
Hugh Kennedy
by W. Bakewell & Sons
his Attorneys (No Model.) 4 Sheets—Sheet 2.
H. KENNEDY.
GAS REGULATING AND CUT-OFF VALVE.
No. 457,203. Patented Aug. 4, 1891.
*Fig. 2.*
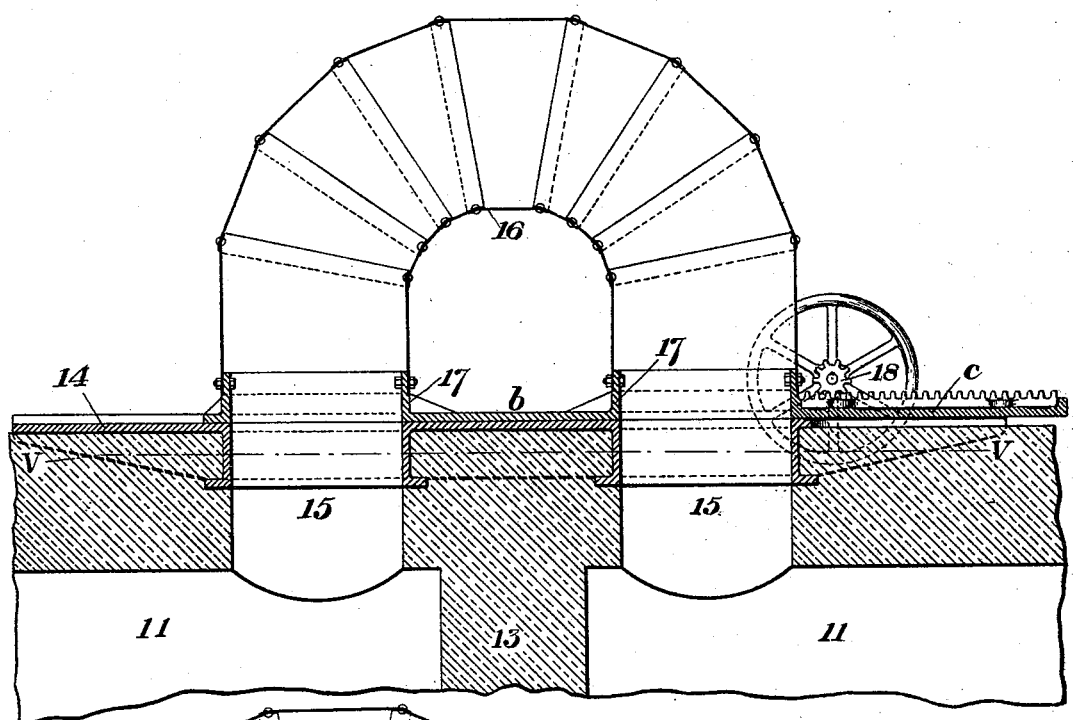
*Fig. 2.'*
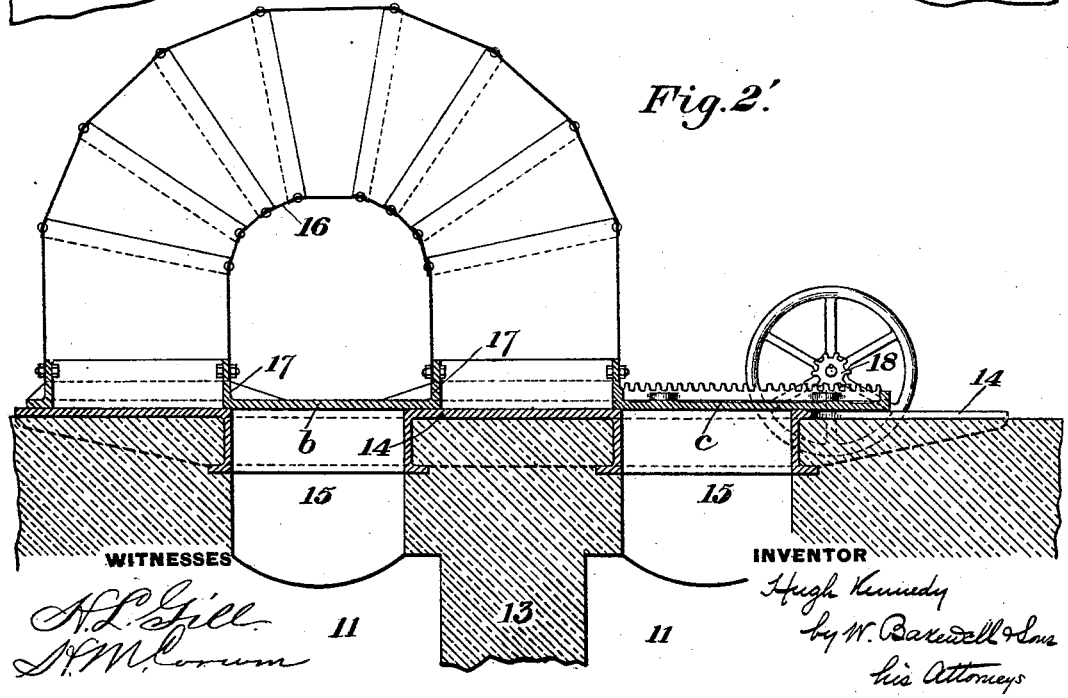

(No Model.) 4 Sheets—Sheet 3.

H. KENNEDY.
GAS REGULATING AND CUT-OFF VALVE.

No. 457,203. Patented Aug. 4, 1891.

WITNESSES
INVENTOR
Hugh Kennedy
by W. Bakewell & Sons
his Attorneys (No Model.) 4 Sheets—Sheet 4.

H. KENNEDY.
GAS REGULATING AND CUT-OFF VALVE.

No. 457,203. Patented Aug. 4, 1891.

WITNESSES
N. L. Gill
N. B. Cosmor

INVENTOR
Hugh Kennedy
by W. Bakewell & Sons
his Attorneys.

THE NORRIS PETERS CO., PHOTO-LITHO., WASHINGTON, D. C.

UNITED STATES PATENT OFFICE.

HUGH KENNEDY, OF SHARPSBURG, PENNSYLVANIA.

GAS REGULATING AND CUT-OFF VALVE.

SPECIFICATION forming part of Letters Patent No. 457,203, dated August 4, 1891.

Application filed December 26, 1890. Serial No. 375,857. (No model.)

*To all whom it may concern:*

Be it known that I, HUGH KENNEDY, of Sharpsburg, in the county of Allegheny and State of Pennsylvania, have invented a new and useful Improvement in Gas Regulating and Cut-Off Valves, of which the following is a full, clear, and exact description, reference being had to the accompanying drawings, forming part of this specification, in which—

Figure 1:
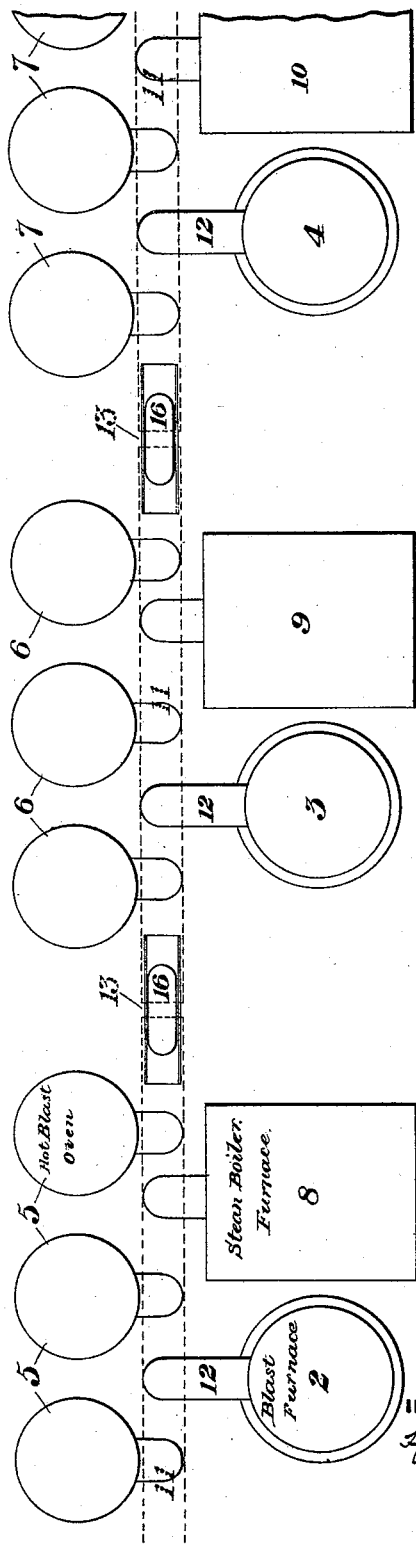
Figure 3:
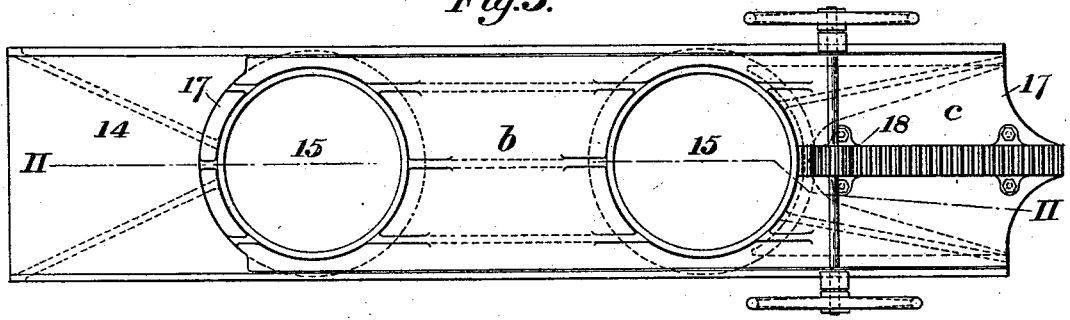
Figure 4:
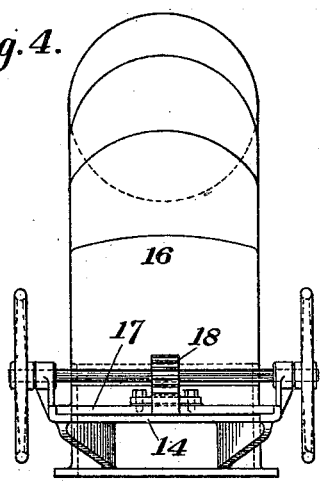
Figure 5:
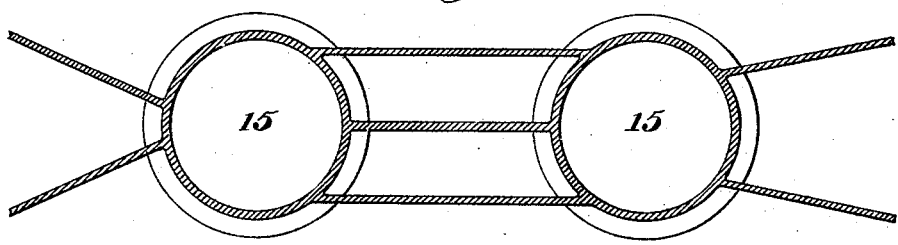
Figure 6:
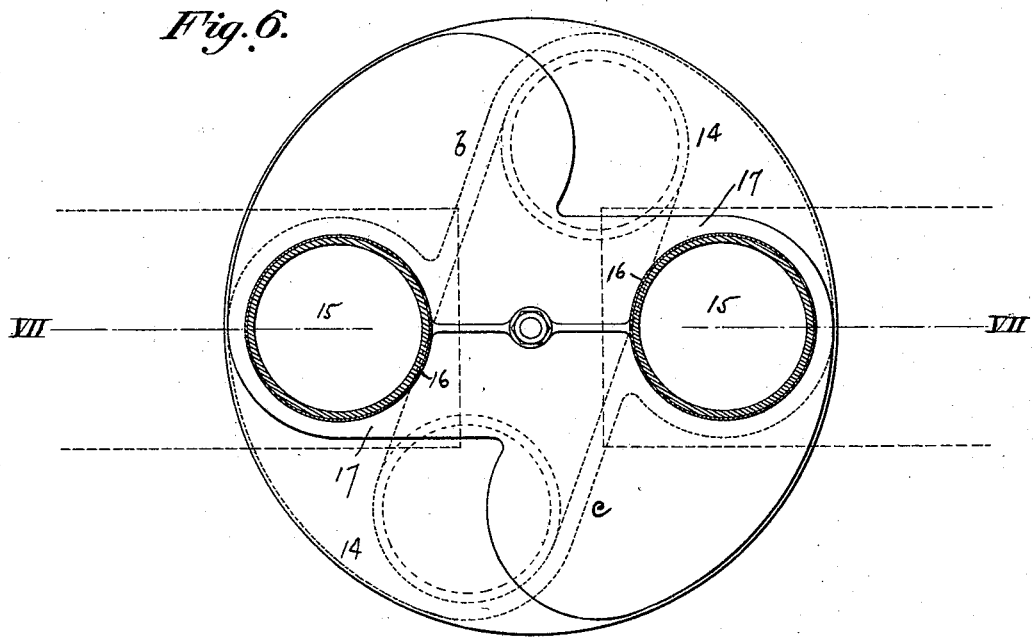
Figure 7:
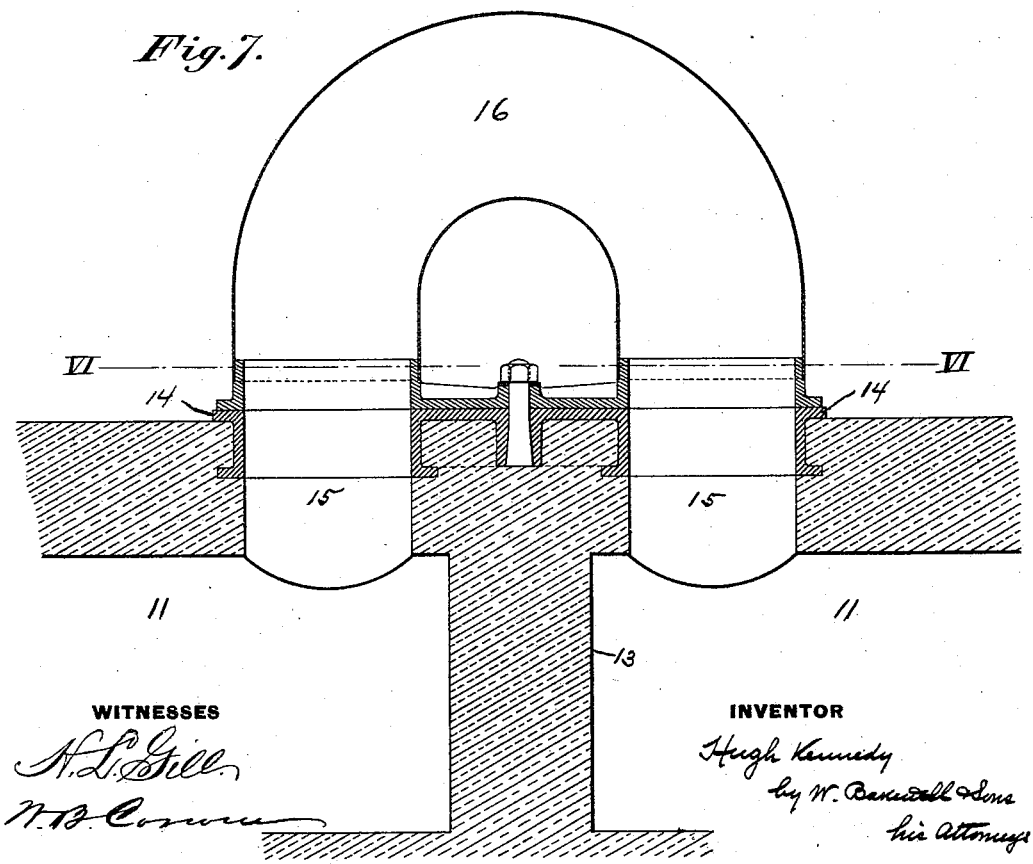

Figure 1 is a diagram plan view illustrating the application of my invention to a blast-furnace plant. Fig. 2 is a vertical sectional view of a part of the gas-conduit and the means for disconnecting the same, the section being on the line II II of Fig. 3. Fig. 2' is a similar view showing the parts in a different position. Fig. 3 is a plan view of the parts shown in Fig. 2. Fig. 4 is an end view thereof. Fig. 5 is a horizontal section on the line V V of Fig. 2, showing the manner in which the parts may be flanged to give them increased strength. Fig. 6 is a plan view of a modification of my invention; and Fig. 7 is a vertical sectional view on the line VII VII, Fig. 6.

Like symbols of reference indicate like parts in each.

My invention will be best understood after a description of the furnace-plant shown in Fig. 1, since it is in its application to such plant that its utility is greatest. In that figure 2 3 4 are blast-furnaces; 5, 6, and 7 are sets of hot-blast stoves used to heat the air used in the operation of the furnaces; and 8, 9, and 10 represent batteries of steam-boilers used to supply steam for operating the engines used in the furnace-plant.

In blast-furnace practice it is usual to employ the carbonic-oxide gas generated by the furnace as the means for heating the stoves and the steam-boilers, and when the plant comprises several furnaces it has been found to conduce to the regularity of operation to cause all the furnaces to discharge their gases into a common main conduit from which they are led to the stoves and boilers. Such conduit is represented at 11, the gas being delivered thereinto from the furnaces by pipes 12. Valves placed in the conduit have been used to cut it off from connection with the individual furnaces when necessary to do so in order to allow the workmen to get access to parts where the presence of gas would be dangerous, the bell and hopper of the furnace being in such case closed and the furnace-blast turned off. Owing, however, to the large size of the conduit and to the correspondingly large size of the valves necessary to be used, it has been found to be very difficult to shut off the gas perfectly, even though special effort be made to attain this end by closing the valve-joints with sand and clay, and consequently the gas often leaks past the valve and impedes the workmen or endangers the safety of the apparatus by rendering explosions likely to occur. The expense of such valves and the difficulty of handling them, owing to their great weight, have been sources of objection to their use. By means of my invention it becomes possible to dispense with the use of such valves, the cost of construction is cheapened, and a much more efficient and safer apparatus is afforded than has been known heretofore. In applying my invention, instead of making the conduit continuous I divide it by cross-walls 13 into parts corresponding in number to the number of furnaces or sets of furnaces in the plant, and connect the adjacent parts with each other by removable pipe connections, preferably constructed as hereinafter described, so that when the parts are thus disconnected possibility of leakage of gas from one part of the conduit to the other is altogether prevented.

The preferable form of the device for connecting and disconnecting the parts of the conduit is shown in Figs. 2 and 5. In Fig. 2 I show a part of the conduit 11 and one of the cross-walls 13. Above the cross-wall is a horizontal plate-casting 14, having holes which register with and form continuations of holes 15 made in the top of the conduit on opposite sides of the wall. 16 is a pipe of ∩ shape fixed at its ends to a plate-casting 17, having holes registering with the openings of the pipe and adapted to register with the holes 15 of the plate 14. The plate 17 is set on the plate 14, as shown, and may be provided with rack-and-pinion mechanism 18, by which it may be moved longitudinally thereon. When the device is in the position shown in Fig. 2, the parts of the conduit on opposite sides of the wall are connected to afford free passage for the gas; but if the plate 17 be moved horizontally to the left into the position shown in Fig. 2', the parts *b* and *c* of the plate will cover the holes 15 and the branches of the movable pipe removed from the holes, so as to cut off entirely the connection between the parts of the conduit and to render the passage of gas impossible. By setting the pipe at intermediate positions the holes may be closed partially and the passage of gas thus regulated as desired.

In the modification of Figs. 6 and 7 the plate 17 is supported upon a central pivot and oscillates thereon to connect or close the conduits, extensions 6, &c., being provided upon the plate for closing the openings as the pipe-section moves into the position shown in dotted lines in Fig. 6.

It will be understood that modifications in construction and arrangement of the movable pipe connection may be made by the skilled mechanic without variance from the principles of my invention, as stated in the following claims. Thus, instead of arranging the pipe connection so that it shall be movable longitudinally on its seat, it may be made to turn thereon, as above described, and other changes in the form of the parts will be suggested by reading the foregoing specification. Application of the pipe connection to other places than to underground conduits may be made. Thus it may be put on the surfaces of pipes or conduits of any form for conducting hot or corrosive gases from furnaces, &c.

I claim—

1. In gas-valve mechanism, the combination of a gas-conduit having openings therein and a plate set thereon having openings on the same or parallel planes and carrying a pipe-section connecting the plate-openings, said plate being movable to simultaneously connect or close the openings, substantially as and for the purposes described.

2. In gas-valve mechanism, the combination, with an interrupted gas-conduit having openings faced with a valve-seat plate, of a valve-plate set on the valve-seat plate, having openings connected by a pipe-section and adapted to register with the openings in the valve-seat plate, said valve-plate being movable to connect said openings or to close the same, substantially as and for the purposes described.

3. In a furnace plant comprising two or more sets of blast-furnaces and regenerators having a common conduit into which gas is discharged from the blast-furnaces, said conduit being interrupted substantially as described, the combination, with such interrupted conduit, of a movable hollow section connecting the interrupted parts and movable to disconnect the same, substantially as and for the purposes described.

In testimony whereof I have hereunto set my hand this 22d day of December, A. D. 1890.

HUGH KENNEDY.

Witnesses:
 THOMAS W. BAKEWELL,
 R. H. WHITTLESY.